United States Patent
Hoogendijk

[11] Patent Number: 5,877,613
[45] Date of Patent: Mar. 2, 1999

[54] HIGH-VOLTAGE GENERATOR WITH VOLTAGE CONTROL ON THE BASIS OF THE DISCHARGE CURRENT

[75] Inventor: Gerardus Hoogendijk, Almelo, Netherlands

[73] Assignee: Technotion B.V., Netherlands

[21] Appl. No.: 956,885

[22] Filed: Oct. 22, 1997

[30] Foreign Application Priority Data

Nov. 5, 1996 [EP] European Pat. Off. ............. 96203077

[51] Int. Cl.$^6$ ................................................... G05F 1/153
[52] U.S. Cl. ........................................................... 323/257
[58] Field of Search ....................... 363/50, 51; 323/256, 323/257, 258; 361/18, 87

[56] References Cited

U.S. PATENT DOCUMENTS

| | | | |
|---|---|---|---|
| 4,477,748 | 10/1984 | Grubbs | 315/306 |
| 4,562,508 | 12/1985 | Chen et al. | 361/91 |
| 5,471,377 | 11/1995 | Donig et al. | 363/31 |

FOREIGN PATENT DOCUMENTS

| | | |
|---|---|---|
| 4413690 | 10/1995 | Germany . |
| 60-200806 | 10/1985 | Japan . |

Primary Examiner—Matthew Nguyen

[57] ABSTRACT

During the production of, for example ozone, an electric corona discharge is generated in atmospheric air by means of the high-voltage generator, so that ozone is formed from atmospheric oxygen. The high-voltage generator applies a high voltage between two electrodes (4, 14) in a discharge chamber; the electrodes are insulated from one another by a high-voltage insulator (6) which also acts as a dielectric. Electric breakdowns can occur through the insulator (6), so that in the course of time the surface of the insulator is damaged. The insulator then loses its insulating effect. In order to counteract this phenomenon, the exceeding of a predetermined current threshold value by the discharge current is detected in the high-voltage generator; a microprocessor (46) determines the number of times that said threshold value is exceeded per predetermined time interval, and the high voltage is controlled to a lower value if the number of times per predetermined time interval is too high.

7 Claims, 2 Drawing Sheets

HIGH-VOLTAGE GENERATOR WITH VOLTAGE CONTROL ON THE BASIS OF THE DISCHARGE CURRENT

BACKGROUND OF THE INVENTION

The invention relates to a high-voltage generator for applying a high-voltage discharge current to a discharge unit.

A high-voltage generator of this kind can be used, for example for producing an electric discharge in a discharge chamber (the discharge unit) in order to produce ozone. During such a process a high-voltage generator causes a corona discharge in atmospheric air, so that ozone is formed from the atmospheric oxygen. The corona discharge is caused by the high-voltage generator applying a high voltage between two electrodes in the discharge chamber. The electrodes are separated from one another by a high-voltage insulator which also acts as a dielectric. Atmospheric air is present in the space between the electrodes. The high voltage is controlled to a value such that it does not yet cause high-voltage breakdown but a corona discharge which forms ozone from the oxygen present in the atmospheric air.

Because atmospheric air is treated in the discharge chamber, the condition of this air (i.e. the pressure, temperature, humidity and impurities) will vary comparatively strongly from one instant to another. As a result, it may occur that at a voltage for which initially only a corona discharge occurred an electric breakdown occurs due to the changed atmospheric conditions. This electric breakdown affects the surface of the high-voltage insulator in the discharge chamber, thus degrading its insulating properties. After a large number of electric breakdowns, the high-voltage insulator loses its insulating effect so that the high voltage for generating the corona discharge can no longer be sustained and the high-voltage insulator has to be replaced after a comparatively short period of time.

SUMMARY OF THE INVENTION

It is an object of the invention to counteract the degeneration of the high-voltage insulator in the discharge chamber. To this end, the high-voltage generator according to the invention is characterized in that it includes:

measuring means for detecting exceeding of a predetermined current threshold value by the discharge current, counting means for counting the number of times that the current threshold value is exceeded per predetermined time interval, and adjusting means for adjusting the high voltage to a lower value if the number of times that said threshold is exceeded per predetermined time interval exceeds a predetermined number of times per predetermined time interval.

The invention is based on the recognition of the fact that even a limited number of high-voltage breakdowns may be undesirable, but not very detrimental to the service life of the high-voltage insulator. A situation where the atmospheric conditions have changed to such an extent that high-voltage breakdowns occur, i.e. so that the discharge current strongly increases, is detected by the measuring means which determine that the discharge current exceeds a predetermined current threshold value. Such an event may be incidental, so that it can be ignored, but it may also be of a more or less frequent nature. The latter situation is detected by the counting means which count the number of times that the threshold is exceeded per predetermined time interval. If the number of times that the threshold is exceeded per predetermined time interval exceeds a predetermined number of times per predetermined time interval, the high voltage must be adjusted to a lower value such that high-voltage breakdowns no longer occur. This is realized by activation of the adjusting means by means of the counting means.

The high-voltage generator in a further embodiment of the invention is provided with a power supply transformer in which the measuring means include a measuring winding of the power supply transformer, which measuring winding is connected to the counting means.

Because high-voltage breakdowns are accompanied by changes of a specific frequency in the discharge current, a high-voltage breakdown causes an induction voltage of the same specific frequency in the measuring winding of the power supply transformer, so that this frequency can be advantageously used for the detection of high-voltage breakdowns.

The measuring means of the high-voltage generator in a further embodiment of the invention include a bandpass filter which is connected between the measuring winding and the counting means in order to produce a voltage signal representative of the discharge current.

The exceeding of a threshold value by such a voltage, wherefrom the frequencies of the powering alternating voltage and of the corona discharge have been removed by filtering, can be readily detected. This situation can be simply converted into a logic signal, if desired. This is particularly advantageous if, as in a preferred embodiment of the invention, the counting means of the high-voltage generator include a microprocessor.

The microprocessor of the high-voltage generator in a further embodiment of the invention is arranged to produce a logic signal which indicates that the number of times that the current exceeds the threshold value per predetermined time interval exceeds a predetermined number of times per predetermined time interval.

In an embodiment of the invention the high voltage can be readily controlled by providing the high-voltage generator with a power supply transformer which includes a variable transformer. Such a variable transformer in an embodiment of the invention can be varied by means of a motor controlled by the microprocessor.

BRIEF DESCRIPTION OF THE DRAWINGS

The invention will be described in detail hereinafter with reference to the Figures. Therein.

DESCRIPTION OF THE PREFERRED EMBODIMENT

Figure 1:
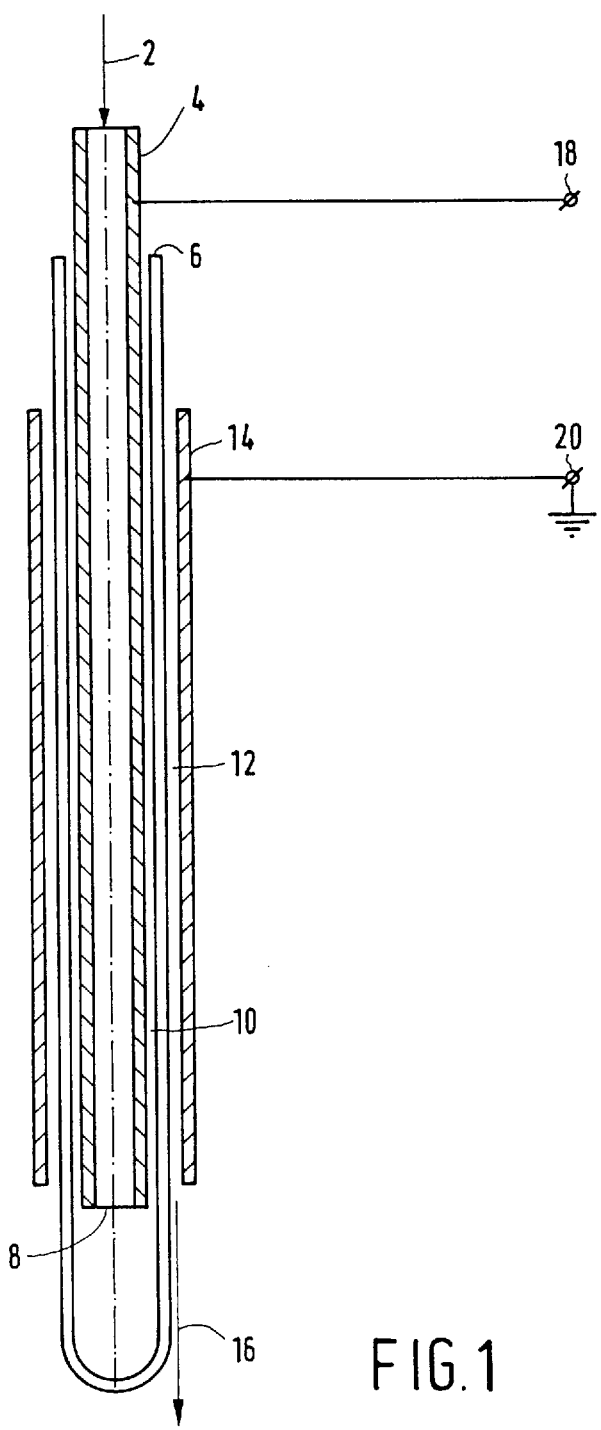
FIG. 1 shows diagrammatically a discharge chamber for producing ozone, the necessary high voltage being generated by a high-voltage generator according to the invention.

FIG. 1 shows a discharge chamber for generating a corona discharge, for example in order to derive ozone from atmospheric air. To this end, a flow 2 of atmospheric air is introduced into a tubular high-voltage electrode 4 which is made of stainless steel and has a length of the order of magnitude of 1 m. The internal diameter of the tube 4 amounts to 6 mm and its external diameter to 8 mm. Around the tubular high-voltage electrode 4 there is arranged an insulating dielectric in the form of a glass tube 6. The glass tube 6 is closed at the side of the exit opening 8 of the high-voltage electrode so that the air introduced is forced to flow back through the space 10 between the outer side of the tubular high-voltage electrode 4 and the inner side of the glass tube 6. The gas flow emerging from the space 10 is subsequently forced (by guide means not shown) to flow through the space 12 between the outer side of the glass tube 6 and the inner side of a tubular, grounded electrode 14. The glass tube 6 has an internal diameter of 9 mm and an external diameter of 10 mm, the tubular grounded electrode 14 having an internal diameter of 12 mm. The gas flow 16 emerging from the space 12 is carried off for further use of the ozone-air mixture.

A voltage of the order of magnitude of 15 kV is applied, via the terminals 18 and 20, between the high-voltage electrode 4 and the grounded electrode 14 (i.e. in the space 10 between the outer side of the tubular high-voltage electrode 4 and the inner side of the glass tube 6 and in the space 12 between the outer side of the glass tube 6 and the inner side of the tubular grounded electrode 14). Consequently, a corona discharge which is not impeded by the glass dielectric 6 occurs in the two spaces 10 and 12. The glass dielectric serves to maintain the high voltage between the two electrodes, i.e. to prevent high-voltage breakdowns. Because of the corona discharge a part of the oxygen in the atmospheric air is converted into ozone. When high-voltage breakdowns occur through the glass of the tube 6, the glass is damaged so that its insulating properties deteriorate in the course of time. The invention offers a solution to this problem as will be described hereinafter with reference to FIG. 2.

Figure 2:
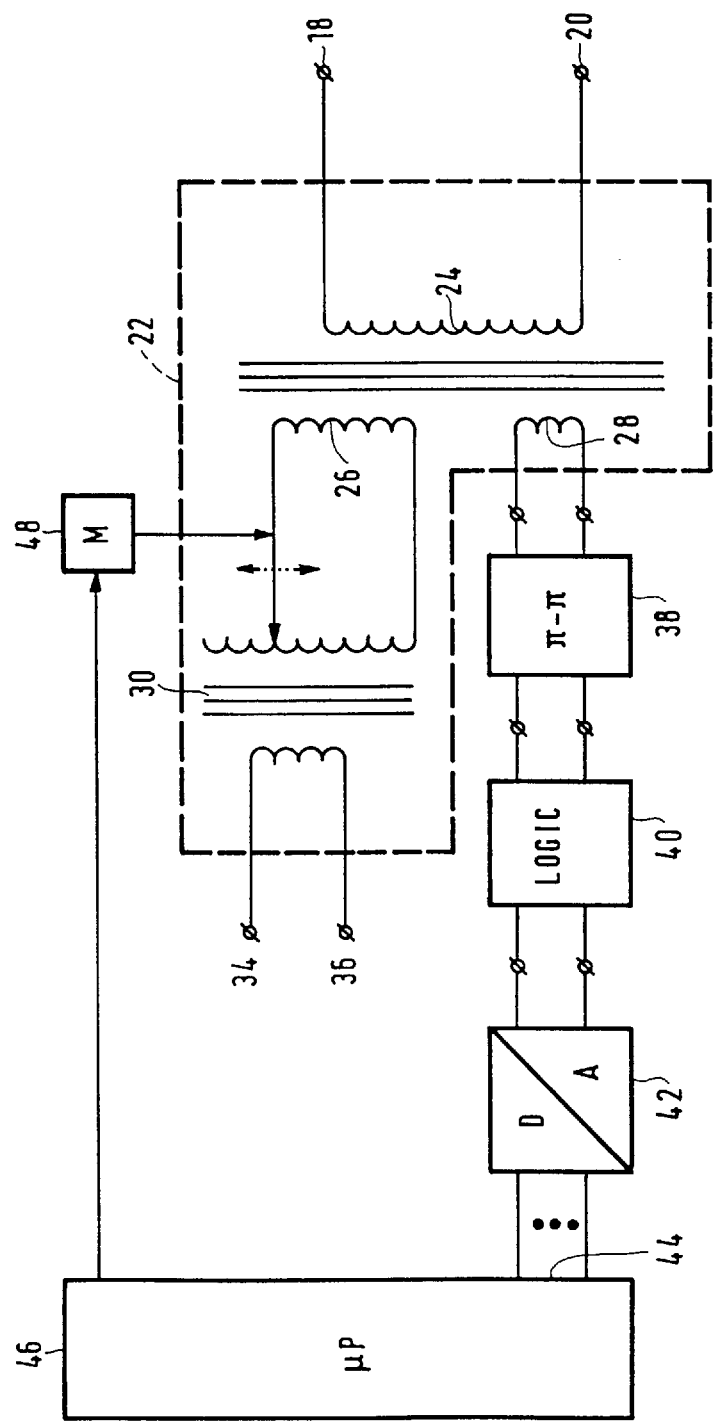
FIG. 2 shows a block diagram of a high-voltage generator according to the invention.

FIG. 2 shows a high-voltage generator according to the invention, partly in the form of a block diagram. The supply transformer of the high-voltage generator according to the invention is provided with a high-voltage transformer 22 for converting a mains voltage having a frequency of 50 Hz or 60 Hz and a value of 220 V into a high voltage of 15 kV. Said mains voltage is applied to the input terminals 34 and 36 and the high voltage appears on the terminals 18 and 20.

The high-voltage transformer 22 includes a variable transformer 30 whereto the mains voltage is applied via the terminals 34 and 36. The variable transformer is adjusted by means of an adjusting motor 48 which is controlled by a microprocessor 46; this control operation will be described in detail hereinafter. The variable transformer 30 forms part of the adjusting means for adjusting the high voltage to a lower value if the number of times that the current threshold is exceeded (due to high-voltage breakdowns) per predetermined time interval exceeds a predetermined number of times per predetermined time interval. The adjusting means also include the adjusting motor 48 and the microprocessor (to be described hereinafter) for controlling the variable transformer 30. The output of the variable transformer 30 is connected to the primary winding 26 of the actual high-voltage section of the high-voltage transformer 22; the high voltage is extracted via the secondary winding 24.

A measuring winding 28 for detecting high-voltage breakdowns is connected to the actual high-voltage section of the high-voltage transformer 22. Via its terminals, the measuring winding is connected to a bandpass filter 38 which may be constructed as a double Π-filter in known manner; however, any other version of an adequately selective bandpass filter can also be used for this purpose. The output signal of the double Π-filter 38 is processed by a microprocessor 46. To this end, the output signal must first be digitized, for which purpose it is applied to an analog-to-digital converter (A/D converter) 42, possibly via a logic circuit 40. The logic circuit 40 may include a threshold circuit for selecting the signals which exceed a predetermined threshold value (corresponding to a predetermined current threshold value associated with a high-voltage breakdown). In this circuit the signal can also be limited to a desired value which corresponds to the logic value to be digitized and can be retained for some time, for example by a sample-and-hold circuit, in order to execute the digitization. The digitized signal is ultimately applied from the A/D converter 42 to a data input 44 of the microprocessor 46. However, it is alternatively possible to abstain from digitizing the signal which exceeds the threshold value and to supply the microprocessor instead with a logic signal which indicates the exceeding of the threshold value; after reception of this logic value, the microprocessor can reset the sample-and-hold circuit again. The measuring winding 28, the double Π-filter 38, the logic circuit 40, the A/D converter 42 and the microprocessor 46 together constitute the measuring means for the detection of the exceeding of a predetermined current threshold value by the discharge current.

The microprocessor 46 is arranged to determine the number of times that the current threshold is exceeded per predetermined time interval. To this end, it is programmed in known manner so as to count this number during a predetermined time interval (for example, one second) and to output a logic signal when a predetermined number of times is exceeded. The microprocessor 46 thus constitutes a counting means for counting the number of current times that the current threshold is exceeded per predetermined time interval. The logic signal to be supplied by the microprocessor may have a single logic value in response whereto the output voltage of the variable transformer is decreased by a fixed amount. It is alternatively possible for the logic output signal to form a measure of the amount whereby the output voltage of the variable transformer is to be decreased.

I claim:

1. A high-voltage generator for applying a high-voltage discharge current to a discharge unit, including:

measuring means (28, 38, 40, 42, 46) for detecting exceeding of a predetermined current threshold value by the discharge current, counting means (46) for counting the number of times that the current threshold value is exceeded per predetermined time interval, and adjusting means (30, 46, 48) for adjusting the high voltage to a lower value if the number of times that said threshold is exceeded per predetermined time interval exceeds a predetermined number of times per predetermined time interval.

2. A high-voltage generator as claimed in claim 1, including a power supply transformer (22) in which the measuring means (28, 38, 40, 42, 46) include a measuring winding (28) of the power supply transformer (22), which measuring winding is connected to the counting means (46).

3. A high-voltage generator as claimed in claim 2, in which the measuring means (28, 38, 40, 42, 46) include a bandpass filter (38) which is connected between the measuring winding (28) and the counting means (46) in order to produce a voltage signal representative of the discharge current.

4. A high-voltage generator as claimed in claim 1, in which the counting means include a microprocessor (46).

5. A high-voltage generator as claimed in claim 4, in which the microprocessor (46) is arranged to produce a logic signal which indicates that the number of times that the current exceeds the threshold value per predetermined time interval exceeds a predetermined number of times per predetermined time interval.

6. A high-voltage generator as claimed in claim 1, provided with a power supply transformer (22), in which the adjusting means (30, 46, 48) include a variable transformer (30).

7. A high-voltage generator as claimed in claim 5, in which the variable transformer (30) can be varied by means of a motor (48) controlled by the microprocessor (46).

* * * * *